June 10, 1969      H. G. KELLER      3,448,630
POWER TRANSMITTING CHAIN
Filed Sept. 12, 1967
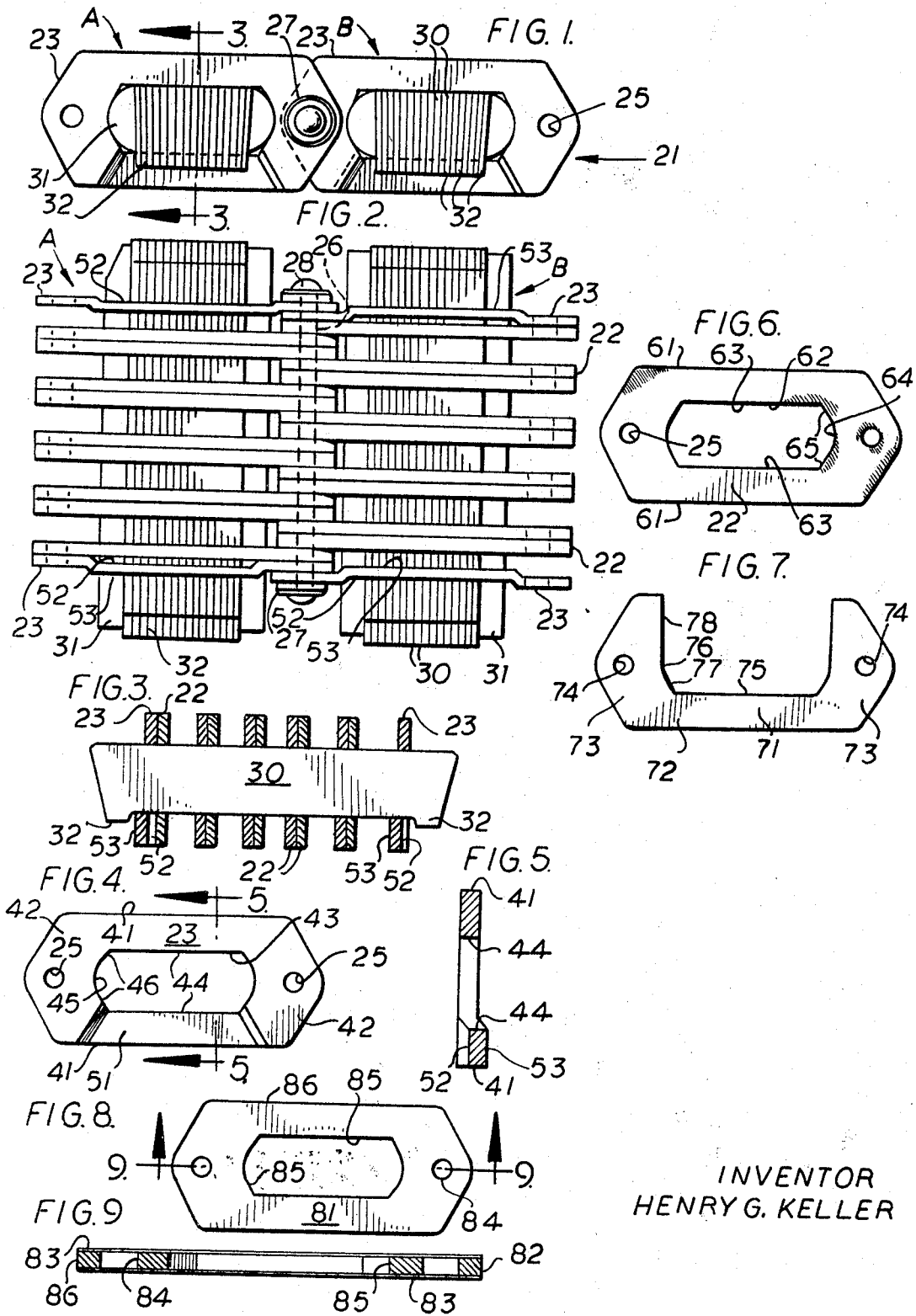
INVENTOR
HENRY G. KELLER ns lighter in weight. It

United States Patent Office 3,448,630
Patented June 10, 1969

3,448,630
POWER TRANSMITTING CHAIN
Henry G. Keller, Glenside, Pa., assignor to FMC Corporation, a corporation of Delaware
Filed Sept. 12, 1967, Ser. No. 667,184
Int. Cl. F16g 1/24
U.S. Cl. 74—236  4 Claims

ABSTRACT OF THE DISCLOSURE

A power transmitting chain having only links, pins and slats with the pins engaging in joint holes of overlapped links and the slats engaged in apertures of the links to extend transversely of the links, the slats being employed to provide side engagement with toothed faces of opposed conical flanges of sheaves in a variable speed power transmission. The chain links are selectively hardened to permit constructing a chain having the aforesaid minimum number of parts.

BACKGROUND OF THE INVENTION

Field of the invention

This invention relates generally to new and useful improvements in articulated power transmitting chains, and more particularly to new and useful improvements in power transmitting chains of the V-type in which slats are employed to provide side engagement with the toothed faces of opposed conical driving flanges of sheaves in a variable speed transmission.

Description of the prior art

Conventional power transmitting chains of the side engaging type employing slats to mesh with the toothed faces of V-pulleys are formed of links which are pivotally connected at their adjacent ends by joint pins. It is conventional practice, to fit a bushing between the joint pins and the links to provide a large wear surface so that the chain will have an acceptable life expectancy.

Further, each link consists of a series of parallel plate members centrally cut away to provide a common transverse opening to receive a group or pack of slat members enclosed or encased within a cage or frame. The ends of the slat members contact the opposed, toothed, conical driving flanges which form the variable pitch diameter sheaves and, as a result of such engagement, the slat members are transversely displaced in opposite directions to collectively adapt themselves to the teeth of the toothed flanges of the sheaves. Due to excessive wear of the plate members, caused by the slat members sliding therein as they are displaced as a result of their engagement with the toothed flanges, it has been deemed necessary in the past to enclose or encase the slat-members in a cage or frame which then fits within the central cut aways of the plate members to provide a large wear surface and thus prolong the life of the chain to an acceptable value.

With such conventional arrangement, the weight of the chain is increased by the presence of joint pin bushings and the cages or frames within which the slat members are enclosed; the chain requires a greater number of parts and; the closed construction with the bushings and cages contributes to the lubricate problems. This chain weight inherently limits the speed at which the chain can be operated.

SUMMARY OF THE INVENTION

The chain of the present invention includes laterally spaced plate members having their end portions overlapped with the end portions of plate members of adjacent links. These overlapped end portions are connected by joint pins passing transversely through and directly engaging in joint holes cut therein. Each plate member is centrally cut away to provide an aperture so that the laterally spaced plate members of each link form a common transverse opening. A group or pack of slat member is disposed within this common transverse opening and slidably engages the interior surfaces thereof. The group or pack of slat members is not enclosed within either a cage or frame, therefore, the slat member directly contact the interior surfaces of the transverse opening formed by the apertures in the plate members. Also the chain is constructed without a liner or bushing disposed between the joint pins and the plate members.

To reduce wear and thus obtain the required life expectancy to provide a chain of the present invention which is acceptable for applications to which previous chains could be applied, the plate members of the chain link are selectively hardened only at their wear points, namely, along the edges of the centrally located aperture and the edges of the joint pitch holes. This selective hardening is accomplished by first suitably plating the sheet material from which the plate members are stamped, and then subsequently stamping out the plate member from this plated material. This inherently leaves the central aperture and joint holes free of plating material. Then the plate member is selectively case hardened in the known manner. This selective case hardening procedure produces a plate member which is hardened only at the surfaces not remaining covered by the plating material. Thusly, a plate member is formed which has both a strong and ductile core but with hardened surfaces at every wear point.

A chain constructed according to the invention has fewer parts than the conventional design of chains of this type, and therefore for a given unit length of chain of similar size a chain of this design is lighter in weight. It is obvious that a chain employing a fewer number of parts has the advantage of a lower material cost and also a lower assembly cost.

Furthermore, the present invention enables construction of a chain having a closer tolerance and better fit than one constructed with a cage encircling the pack of slat members. The cages or frames used to encircle the pack of slat members in conventional chains of this type are made of a thin metal which has to be hardened. This thin walled cage has a tendency to warp during the hardening process. thus causing quality control problems. It is imperative that a chain of this type be built to close tolerance to prevent lost motion during its running which results in a low efficiency rating. It is possible to control the tolerances of the centrally located aperture and therefore a chain constructed according to the present invention has close fitting parts and a minimum of lost motion.

Another advantage of a chain constructed according to the present invention is its lower centrifugal tension. The centrifugal tension of a chain can be calculated by the following formula: chain centrifugal tension equals the (weight per unit length in pounds per foot) × (velocity in feet per minute)$^2$/115,900. It is evident from this equation that the centrifugal tension of a chain is directly proportional to its weight per unit length. Thus a chain having a comparatively lower weight per unit length also has a comparatively lower chain tension.

The chain tension results in forces on the joint pins of the chain. Therefore, if the chain tension of a given chain is less than that of another chain the wear of the articulation joints of the first mentioned chain is correspondingly lower due to the lower value of the forces acting on the joint pins. It obviously follows then, that a chain constructed according to the present invention also has a lower amount of wear at the joint pins than does the conventionally constructed chain of similar size. Both the selective hardening and the lower chain tension permits construction of a chain according to the present invention which has an expected life equal to or greater than that of conventionally designed chains of a similar size and type. This life expectancy is further contributed to by the open chain construction without pin bushings or slat member cages which enables better lubrication of the chain parts.

It is the primary object of the present invention to provide power transmitting chains, of the V-type, for use with sheaves having toothed conical driving flanges, so designed to have a low weight per unit length.

Another important object of this invention is to provide power transmitting chains of the side engaging, slat member pack type which will have both a low centrifugal tension and a high life expectancy.

A further object of the present invention is to provide a power transmitting chain of the V-type, for use with sheaves having toothed conical driving flanges, wherein the plate members of the links are selectively hardened at their wear and load bearing points while having a strong and ductile core.

Other objects and advantages of the invention will be apparent from the following description of preferred embodiments of the invention.

In the accompanying drawings, forming a part of this specification and in which like reference characters are employed to designate like parts throughout the same:

FIG. 1 is a side elevational view of a length of power transmitting chain embodying the present invention, FIG. 2 is a bottom plan view of the length of power transmitting chain illustrated in FIG. 1, FIG. 3 is a sectional view taken on line 3—3 of FIG. 1 showing the sheave engaging slat members and the arrangement of plate members, FIG. 4 is a detailed side elevational view of an outermost plate member, FIG. 5 is a sectional view taken on line 5—5 of FIG. 4, FIG. 6 is a detailed side elevational view of an inner plate member, FIG. 7 is a detailed side elevational view of an alternate design of the inner plate member.

FIG. 8 is a side elevational view of a plate member used to illustrate the method of hardening, and FIG. 9 is a sectional view of an inner plate member taken on line 9—9 of FIG. 8.

In the drawings, wherein for the purpose of illustrations are shown the preferred embodiments of the present invention, and first particularly referring to FIGS. 1-3, inclusive, there is illustrated a length of power transmitting chain 21 that is usable in conjunction with a variable speed transmission with an expansible, variable pitch diameter sheave (not shown) formed with toothed conical driving flanges. A variable speed power transmission of the type which may utilize the chain of the present invention is shown and described in United States Patent No. 2,068,784.

The power transmitting chain 21 includes the alternate links A and B, each one of which is made up of a suitable number of inner plate members 22 and outer plate members 23. The plate members 22 and 23 are arranged in pairs with the exception of one outer plate member 23 on each link which is unpaired. The unpaired plate member 23 occurs on alternate sides of adjacent links.

The end portions of the pairs of plate members 22 and 23 of adjacent links A and B are arranged in overlapped relationship with the end portions of the pairs of plate members of each link alternating with pairs of plate members of adjacent links transversely of the chain 21. It is to be understood that the number and arrangement of the plate members 22 and 23 of adjacent links A and B can be varied in the conventional manner to meet the requirements of particular installations.

Formed in the end portions of each plate member 22 and 23 are joint holes 25 which are transversely aligned in the adjacent links to receive a joint pin 26 which connects the adjacent links A and B for articulating movement. Fitted over the opposite end portions of pin 26 are washers 27 with the ends 28 of pin 26 expanded over the washers to retain the pin within the plate members 22 and 23.

Each plate member 22 or 23 is centrally cut away to provide an aperture which when positioned relative to the apertures of other plate members in a link forms a transverse opening for receiving a pack of sheave engaging slat members 30. The pack of sheaving engaging slats includes, on each side of slat member 30, special retaining slat members 31 to maintain the slat members in a compact arrangement. When properly assembled into a pack, each slat member 30 is permitted to individually partake of limited transverse movement relative to the plate members 22 and 23 of the like. The extent of this transverse movement is determined by the tabs 32 which project downwardly from opposite end portions of the slat members 30 and are so formed to engage the outer plate members 23 when the slat members are displaced transversely thereof to their maximum extent in either direction.

FIGS. 4 and 5 illustrate in detail the outermost plate member 23. Plate member 23 is substantially flat and has a generally hexagonal configuration with one pair of elongated parallel sides 41. A joint hole 25 is located in each of the opposite end portions 42 of the plate member 23. Centrally located on plate member 23 is an aperture 43 formed to receive the pack formed of slat members 30 and 31.

Each of the centrally located apertures 43 is so formed to provide a pair of planar bearing surfaces 44 which are parallel to the elongated sides 41. The end surfaces of this centrally located aperture 43 are formed to receive the end retaining slat member 31. In particular each end surface of the aperture is formed with a parti-cylindrical surface 45 which substantially conforms to the cylindrical portion of slat member 31. To permit limited rocking movement of the slat members 31 each end surface of aperture 43 is also provided with planar surfaces 46 which are tangent to surface 45 and which terminate at the planar surfaces 44.

Plate member 23 is also formed with an offset portion 51 as shown in FIG. 5. This portion 51 is offset transversely of the plate member 23 a distance equal to one half of the thickness of the plate material. For later reference surface 52 will be referred to as the inner surface and surface 53 will be referred to as the outer surface of the offset portion 51.

By referring to the outermost plate members 13 illustrated in FIG. 2, it will be seen that the inner surface 52 of an outermost plate member 23 of link A is in alignment with the outer surface 53 of the associated plate member 23 of link B. Likewise the inner surface 52 of plate member 23 of link B is in alignment with the outer surface 53 of the associated plate member 23 of link A. Due to the overlapped relationship of the outer plate members 23 the offset portions 51 are necessary to form coplanar surfaces for limiting the transverse movement of each slat member pack so that when all the slat members 30 of both links A and B are displaced in the same direction to their maximum extent the end surfaces of the slat members 30 will lie in a common plane. It should be noted that the tabs 32 of slat members 30 overlap the offset portions 51 of the outer plate member 23. Thus the offset portions 51 of the plate members 23 will be engaged by the tabs 32 when the slat members 30 are urged transversely of the plate members and in this manner the extent of the movement of the slat members 30 will be limited.

FIG. 6 illustrates an inner plate member 22 which has a generally hexagonal configuration with elongated parallel sides 61. The centrally located aperture 62 is formed to provide a pair of planar bearing surfaces 63 which are parallel with the elongated sides 61. Each end portion of the centrally located aperture 62 is similar in configuration to the end portions of the centrally located aperture 43 of the outer plate member 23 illustrated in FIG. 4 and is formed to provide a parti-cylindrical surface 64 and two planar surfaces 65 which are tangent to surface 64 and which terminate at the planar surfaces 63. Formed in the end portions of the plate member 22 are joint holes 25 to receive joint pins 26.

The inner plate members 22 may be arranged in pairs as they are illustrated in FIGS. 1-3 inclusive, or they may be arranged in overlapped relationship with the end portions of the plate members of each link alternating with plate members of the adjacent links transversely of the chain. Furthermore, it is to be understood that the number and arrangement of the plate members 22 of the adjacent links A and B may be varied in the conventional manner to meet the requirements of particular installations.

FIG. 7 illustrates another embodiment of the invention, and in particular shows an alternate inner plate member 71. The inner plate member 71 is formed with a medial portion 72 which is substantially flat and rectangular in configuration and two flat end portions 73 which have a substantially pentagonal planar configuration. A joint hole 74 is provided in each end portion 73 to receive a joint pin 26.

Inner plate member 71, rather than having a centrally located aperture, forms a U-shaped opening which provides a substantially planar bearing surface 75 upon which the slat members 30 ride. The U-shaped opening is also formed to provide two parti-cylindrical surfaces 76 each of which has a radius substantially equal to the radius of the parti-cylindrical portions of the end retaining slat 31. Extending inwardly and downwardly from and tangentially to each parti-cylindrical surface 76 is a planar surface 77 which terminates at the planar bearing surface 75. Extending upwardly from each parti-cylindrical surface 76 is another planar surface 78 which is tangent thereto and which terminates at the upper boundary of the plate member 71.

The inner plate member 71 is designed to further reduce the weight per unit length of a chain of the present invention. The plate members 71 should be arranged in pairs with the mouth of the U-shaped opening of one plate member of the pair extending upwardly and the mouth of the U-shaped opening of the other plate member of the pair extending downwardly so that the two plate members cooperate to form a centrally located aperture similar in configuration to the aperture of plate member 22, illustrated in FIG. 6. Although a paired arrangement is more desirable, the plate members 71 may also be arranged in overlapped relationship with the end portions of the plate members of each link alternating with the plate members of the adjacent links transversely of the chain.

The plate members should be selectively hardened so that the core of the plate member remains strong and ductile to be resistant to cracking, and at the same time the load bearing or wear surfaces of the plate member should be hardened to resist wear. The load bearing surfaces of the plate member include the surfaces upon which the slat members ride and the interior surfaces of the joint holes.

FIG. 8 illustrates a plate member 81 having a configuration similar to that of plate member 22 illustrated in FIG. 6. The hardening method employed to obtain the desired results described above is commonly referred to as selective case hardening. Selective case hardening may be obtained in various ways such as carburizing, cyaniding, and liquid carburizing, but the method described here is considered to be the preferred method of practicing this invention.

The plate member 81, illustrated in FIGS. 8 and 9, is stamped from a sheet of low carbon steel (indicated by reference character 82) which has been plated in a normal manner with copper, nickel or other material which is substantially impervious to the case hardening process to be utilized. The plating layer 83 must be applied in a manner which will produce a fine grained, continuous plate. A stamping process is utilized to produce a blanked part with the interior surfaces 84 of the joint hole, the interior surfaces 85 of the centrally located aperture and the peripheral surfaces 86 of the plate member then being free of plating material. It should be noted that the surfaces 84, 85 and 86 are the surfaces which receive wear due to articulation of the chain, transverse movement of the slat members or mishandling.

The plate 81, with the surfaces 84, 85 and 86 exposed, is then subjected to a carburizing process by imbedding the plate member in a carbonous substance or gas, or other suitable carbonous material, so that the latter contacts the exposed load bearing or wear surfaces. The plate member and carburizing substance are then subjected to suitable temperatures to complete the carburizing process.

The method of liquid carburizing may also be employed if care is taken to prevent the cyanide bath from becoming saturated with copper, if this is used as the plating material, which would then be redeposited on the workpiece. The method of liquid carburizing using cyanide is described on page 130 of volume II of the 1964 edition of Metals Handbook published by American Society of Metals. It is also possible to practice this invention by using a nitriding type of case hardening process.

Following the above procedure of plating, exposing proper surfaces incident to blanking the plate members out of plated material, and case hardening yields a plate member having a hardened case at the load bearing or wear surfaces and also having a core which remains ductile so that the plate member retains its toughness and resistance to cracking.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. A power transmitting chain for use with a variable speed transmission having a driving and a driven member, at least one of which comprises an expansible pulley having projections and depressions formed on the opposed driving flanges thereof, the chain being formed of a multiplicity of connected links, each link comprising:

a plurality of laterally spaced plate members having opposite end portions thereof overlapped with associated end portions of plate members of adjacent links, each of said plate members having a centrally located aperture therethrough and a joint hole through each of its end portions, each plate member having an outer peripheral edge surface and interior edge surfaces defining its holes and its aperture, said plate members being case hardened only at said edge surfaces;

a joint pin engaging and axially confined in said joint holes of said overlapped end portions of a pair of adjacent links; and a plurality of slat members engaged with and extending through said apertures of said plate members so as to be capable of limited independent sliding movement transversely of said apertures, said slat members projecting laterally outwardly from the outermost plate member on either side of said link to form driving teeth for engaging the driving flanges of the expansible pulley.

2. A chain having links as defined in claim 1, further characterized by:

said slat members being formed with a tab extending from each end portion thereof and overlapping the outermost plate member on either side of said link; and each of said outermost plate members being formed with an offset portion for cooperating with said tabs to limit movement of said slat members transversely of the link through said apertures.

3. A power transmitting chain for use with a variable speed transmission having a driving and a driven member, at least one of which comprises an expansible pulley having projections and depressions formed on the opposed driving flanges thereof, the chain being formed of a multiplicity of connected links. each link comprising:

a plurality of laterally spaced pairs of plate members having a joint hole passing through opposite end portions thereof, said end portions of pairs of plate members being overlapped with associated end portions of pairs of plate members of adjacent links, said plate members being formed and arranged to define a centrally located aperture extending transversely of the link, each plate member having an outer peripheral edge surface and interior edge surfaces defining its holes and said aperture, said plate members being case hardened only at said surfaces;

a joint pin engaging and axially confined in said joint holes of said overlapped end portions of a pair of adjacent links; and a plurality of slat members engaged with and extending through said apertures of said plate members so as to be capable of limited independent sliding movement transversely of said apertures, said slat members projecting laterally outwardly from the outermost plate member on either side of said link to form driving teeth for engaging the driving flanges of the expansible pulley.

4. A chain having links as defined in claim 3 further characterized by:

said slat members being formed with a tab extending from each end portion thereof and overlapping the outermost plate member on either side of said link for cooperating therewith to limit the movement of said slat members transversely of said link.

References Cited
UNITED STATES PATENTS

| | | | |
|---|---|---|---|
| 1,601,663 | 9/1926 | Abbott | 74—245 |
| 2,038,583 | 4/1936 | Maurer | 74—236 |
| 2,853,886 | 9/1958 | Besel | 74—236 |

FRED C. MATTERN, JR., *Primary Examiner.*

J. A. WONG, *Assistant Examiner.*

U.S. Cl. X.R.

74—250